US011115226B2

(12) United States Patent
Wiener et al.

(10) Patent No.: US 11,115,226 B2
(45) Date of Patent: Sep. 7, 2021

(54) DEBRIEF MODE FOR CAPTURING INFORMATION RELEVANT TO MEETINGS PROCESSED BY A VIRTUAL MEETING ASSISTANT

(71) Applicant: Cisco Technology, Inc., San Jose, CA (US)

(72) Inventors: David Abraham Wiener, Redwood City, CA (US); Omar Tawakol, Los Altos, CA (US); Tyler Scott, Edmonds, WA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 91 days.

(21) Appl. No.: 15/884,306

(22) Filed: Jan. 30, 2018

(65) Prior Publication Data
US 2019/0238354 A1 Aug. 1, 2019

(51) Int. Cl.
*H04L 12/18* (2006.01)

(52) U.S. Cl.
CPC ...... *H04L 12/1818* (2013.01); *H04L 12/1831* (2013.01)

(58) Field of Classification Search
CPC . H04L 12/1818; H04L 12/1831; G06Q 10/06; G06Q 10/06311; G06Q 10/0631; G06Q 10/101; G06Q 10/1053; G06Q 40/04; Y04S 10/54; Y04S 707/99948; Y04S 707/99945; G06F 9/44; G06F 17/50
See application file for complete search history.

(56) References Cited

U.S. PATENT DOCUMENTS

| 10,897,368 | B2* | 1/2021 | Mahmoud | H04L 12/1818 |
| 2005/0034079 | A1* | 2/2005 | Gunasekar | G06Q 10/10 715/753 |
| 2006/0247962 | A1* | 11/2006 | Harvey | G06Q 10/109 709/204 |
| 2008/0133600 | A1* | 6/2008 | Uehori | G06Q 10/10 |
| 2008/0177611 | A1* | 7/2008 | Sommers | G06Q 10/1095 705/7.19 |
| 2010/0318399 | A1* | 12/2010 | Li | G06Q 10/109 705/7.18 |
| 2013/0212703 | A1* | 8/2013 | Ramesh | G06Q 10/06393 726/28 |
| 2017/0099361 | A1* | 4/2017 | Digilov | H04W 4/023 |

(Continued)

*Primary Examiner* — Dhairya A Patel
*Assistant Examiner* — Sandarva Khanal
(74) *Attorney, Agent, or Firm* — Merchant & Gould P.C.

(57) ABSTRACT

In one embodiment, the interactive virtual meeting assistant implements a meeting debrief post-processing operation. For a given meeting that the interactive virtual meeting assistant participated in, a meeting post-processing engine enables one or more participants of the meeting to associate a debrief with the meeting. The debrief may be an audio recording, a video recording, text, or any file. The meeting post-processing engine stores the debrief in data stores and provides access to the debrief via the meeting GUI associated with the meeting. The meeting post-processing engine also processes the debrief to generate tasks to be assigned to participants or other entities and/or schedule reminders to be provided to the participants or other entities. The debrief may be private, such that only the participant who provided the debrief may subsequently access the debrief.

20 Claims, 6 Drawing Sheets

(56) References Cited

U.S. PATENT DOCUMENTS

2018/0101761 A1* 4/2018 Nelson ................ G06Q 10/10
2018/0137402 A1* 5/2018 Bar ..................... G06N 3/063
2018/0211223 A1* 7/2018 Jacobson ........... H04L 12/1831
2019/0132265 A1* 5/2019 Nowak-Przygodzki ....................
　　　　　　　　　　　　　　　　　　　　　　　　　　H04L 51/02

* cited by examiner

DEBRIEF MODE FOR CAPTURING INFORMATION RELEVANT TO MEETINGS PROCESSED BY A VIRTUAL MEETING ASSISTANT

BACKGROUND OF THE INVENTION

Field of the Invention

Embodiments of the present invention relate generally to interactive virtual assistants, and more specifically, to a debrief mode for capturing information relevant to a meeting processed by a virtual assistant meeting.

Description of the Related Art

Interactive virtual assistants are becoming more commonplace to provide an easy way for a user to accomplish the user's goals via a computer. In conventional approaches, interactive virtual assistants may receive a voice input from the human user, parse the words spoken by the user, and cause an action requested by the user to be performed. For instance, the user may request ordering a particular item from a shopping website or making a phone call to a person whose contact information is stored in a contact database, and, in response, the interactive virtual assistant causes a computer to order the requested item or causes a telephone to make the requested call.

However, conventional approaches have not effectively integrated interactive virtual assistants into a meeting environment. There are several technical challenges when integrating interactive virtual assistants into a meeting environment. For example, there are a variety of disparate platforms and services for conducting meetings. Because such platforms and services do not typically follow a standard, creating an interactive virtual assistant that is able integrate with the disparate platforms and services is technically challenging. Further, given that a meeting typically has at least two vocally active participants, providing a useful and complete set of features to the meeting participants requires sophisticated natural language and audio processing operations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
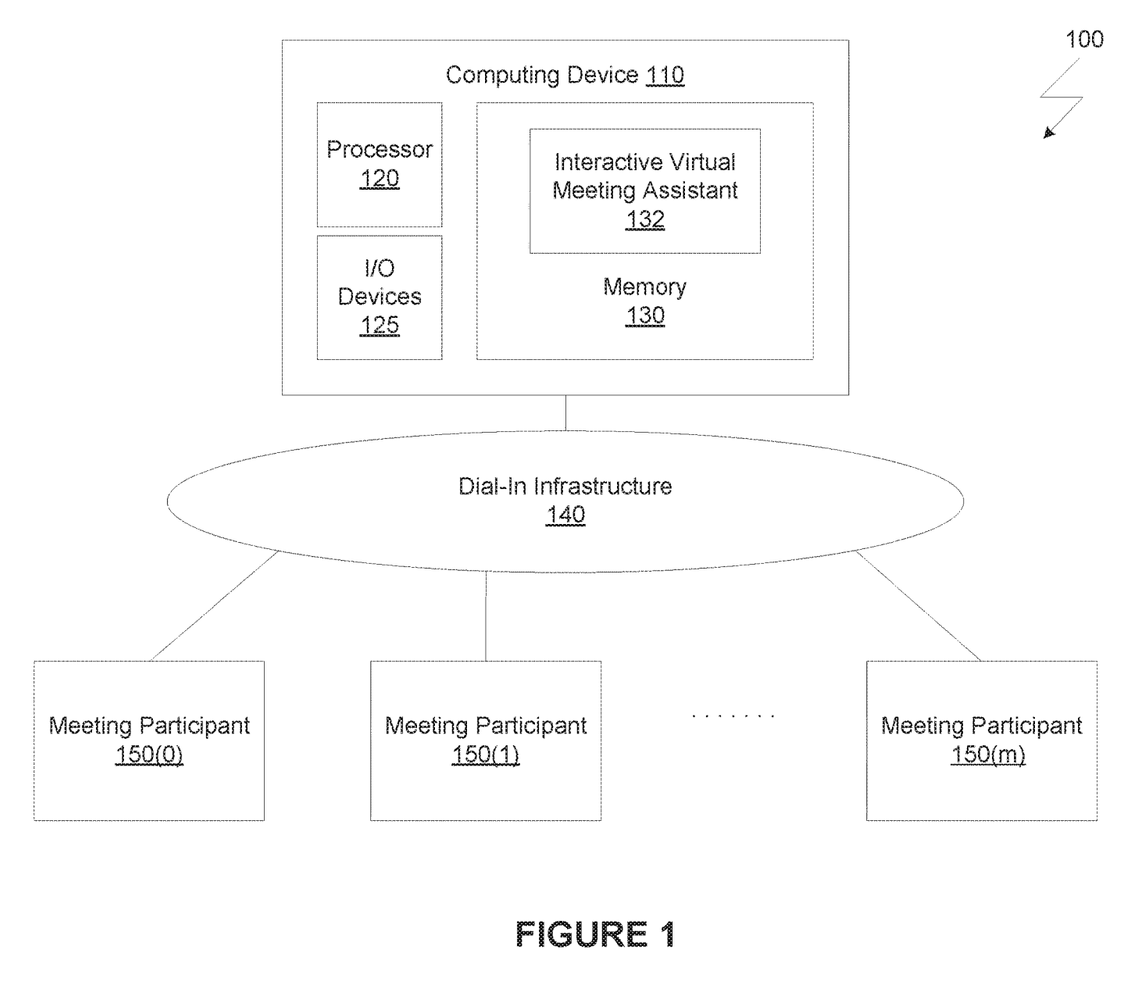
FIG. 1 illustrates a system configured to implement one or more aspects of the present invention.

FIG. 1 illustrates a system 100 configured to implement one or more aspects of the present invention. As shown, system 100 includes, without limitation, a computing device 110 coupled via dial-in infrastructure networks 140 to multiple meeting participants 150(0) to 150(m).

As shown, the computing device 110 includes, without limitation, a processor 120, input/output (I/O) devices 125, and a memory 130. Processor 120 may be any technically feasible form of processing device configured to process data and execute program code. Processor 120 could be, for example, a central processing unit (CPU), a graphics processing unit (GPU), an application-specific integrated circuit (ASIC), a field-programmable gate array (FPGA), and so forth. I/O devices 125 may include devices configured to receive input or provide output, including, for example, a keyboard, a mouse, a display, and so forth.

Memory 130 may be any technically feasible storage medium configured to store data and software applications. Memory 130 may be, for example, a hard disk, a random-access memory (RAM) module, a read-only memory (ROM), and so forth. As also shown, the memory 130 includes, without limitation, an interactive virtual meeting assistant 132, which is a software application that, when executed by the processor 120, causes processor 120 to execute an interactive virtual meeting assistant application. The interactive virtual meeting assistant 132 may include any technically feasible type of virtual meeting assistant, such as the Eva™ application from Voicera, Inc.

Dial-in infrastructure networks 140 may be any technically feasible network or set of interconnected communication links that enable the interactive virtual meeting assistant 132, executed by processor 120, to participate in a meeting with one or more meeting participants 150(0) to 150(m). As shown, the dial-in infrastructure may include, without limitation, one or more telephone line connections or one or more computer connections, such as a local area network (LAN), wide area network (WAN), the World Wide Web, or the Internet, among others. The dial-in infrastructure networks 140 may also enable the interactive virtual meeting assistant 132 to access other information via the networks, such as by accessing information via the World Wide Web, or the Internet, among others.

Meeting participants 150(0) to 150(m) represent one or more human and/or computer participants in a meeting environment. Each of the one or more meeting participants 150(0) to 150(m) may be connected to other meeting participants and the interactive virtual meeting assistant 132, as executed by processor 120, via any technically feasible device that forms a connection to other meeting participants, such as a telephone, smartphone, computing device, or personal data assistant, among others. The connections linking the meeting participants 150(0) to 150(*m*) may be any technically feasible communication link(s), including, without limitation, communication links included in the dial-in infrastructure networks 140, and/or one or more other external communication links, including, without limitation, one or more telephone line connections or one or more computer connections, such as a local area network (LAN), wide area network (WAN), the World Wide Web, or the Internet, among others.

Although FIG. 1 shows the interactive virtual meeting assistant 132 stored in the memory 130 of the computing device 110, in alternative embodiments, the interactive virtual meeting assistant 132 may be stored in-part or entirely in the memory 130 and/or any technically feasible memory device internal to or external to the computing device 110, including any memory device coupled to the computing device 110 through a wired connection, a wireless connection, a network connection, and so forth.

As described in greater detail below in conjunction with FIGS. 2-6, the interactive virtual meeting assistant 132 receives an invitation to participate in a meeting environment, parses text information included in or derived from the invitation to determine meeting information necessary for the interactive virtual meeting assistant 132 to join the meeting, and either joins the meeting based on the meeting information determined from parsing the received text information, or returns an error message indicating that the meeting information could not be correctly determined from parsing the received text information. When the meeting concludes, the interactive virtual meeting assistant 132 performs one or more post-processing operations to generate metrics, tasks, trigger notifications, etc. associated with the meeting.

Interactive Virtual Meeting Assistant

Figure 2:
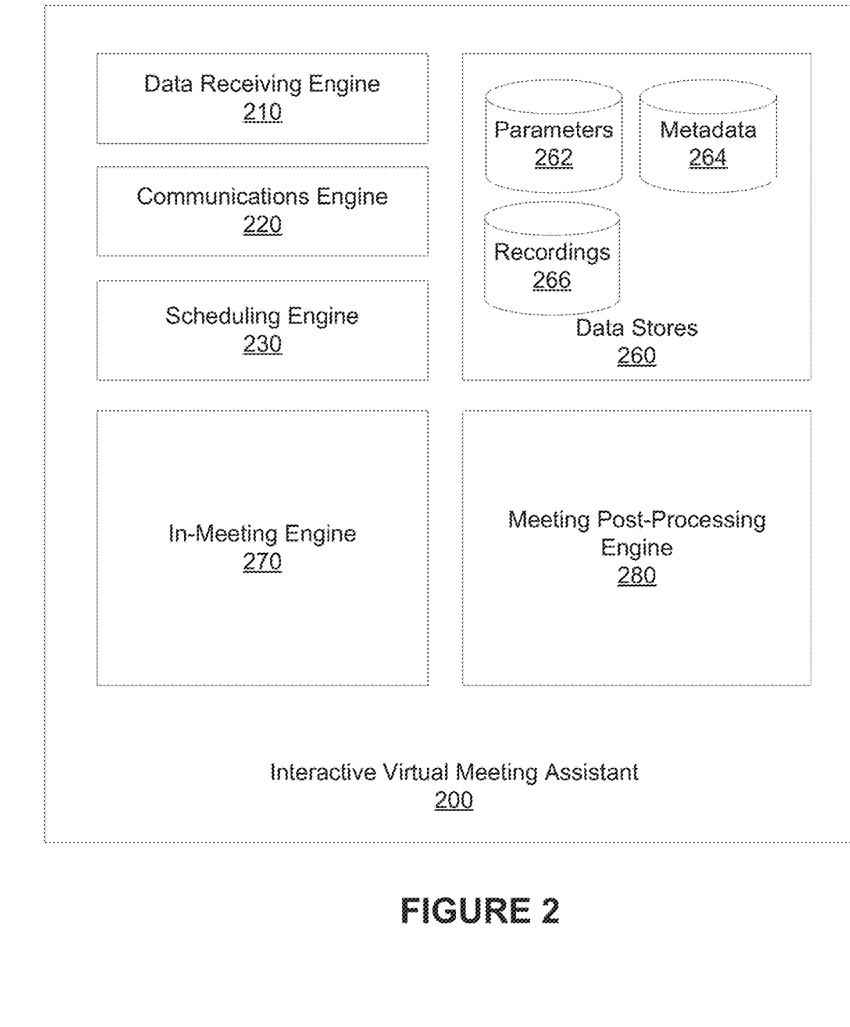
FIG. 2 illustrates a more detailed illustration of the interactive virtual meeting assistant of FIG. 1, according to various embodiments of the present invention.

FIG. 2 illustrates interactive virtual meeting assistant 200, which is a more detailed illustration of the interactive virtual meeting assistant 132 of FIG. 1, according to various embodiments of the present invention. As shown, interactive virtual meeting assistant 200 includes, without limitation, a data receiving engine 210, a communications engine 220, a scheduling engine 230, data stores 260, an in-meeting engine 270, and a meeting post-processing engine 280.

Data receiving engine 210 may receive data from a user requesting to integrate the interactive virtual meeting assistant 200 into a meeting environment. Types of data received from the user via the data receiving engine 210 may include, without limitation, a telephone call or other voice information received from the user, text or other data received from the user via a website associated with the interactive virtual meeting assistant 200, text or other data received from the user via an application associated with the interactive virtual meeting assistant 200, or an email, calendar invite, or other message containing text information received from the user, among others.

For voice data received via a telephone connection or other voice connection, the data receiving engine 210 may convert the received voice data into text via a voice-recognition mechanism (not shown) for converting voice to text information. Such voice recognition mechanisms would be well-understood by persons of skill in the art and are not described in further detail herein. In various embodiments, for data received via the data receiving engine 210 that incudes text information or is converted into text information, such as voice data converted into text via a voice-recognition mechanism, the text information may include text that is formatted according to a predetermined format, or the text information may include text that is free-form, as written by the user, and does not follow any predetermined format.

Communications engine 220 may perform actions to connect the interactive virtual meeting assistant 200 to the meeting environment via the dial-in infrastructure networks 140, based on the data received from the user via the data receiving engine 210. In various embodiments, data may be received via the data receiving engine 210 to cause the communications engine 220 to integrate the interactive virtual meeting assistant 200 into a meeting environment immediately. In other embodiments, data may be received via the data receiving engine 210 to cause the communications engine 220 to integrate the interactive virtual meeting assistant 200 into a meeting environment at a later time.

In various embodiments, data received via the data receiving engine 210 seeking to integrate the interactive virtual meeting assistant 200 into a meeting immediately may include data received via a voice connection, via a website connection, or via another form of application, among others. In such circumstances, where the interactive virtual meeting assistant 200 is to be integrated into the meeting environment immediately, the interactive meeting assistant 200 may be integrated into the meeting environment using the data received via the data receiving engine 210, without retrieving any additional information about the meeting. For instance, the communications engine 220 may form a connection to integrate the interactive meeting assistant 200 into the meeting environment immediately in response to data associated with the user pushing one or more buttons on a telephone via a telephone connection. In other embodiments, the communications engine 220 may form a connection to integrate the interactive meeting assistant 200 into the meeting environment immediately in response to receiving data via a data connection, such as via a website or via an application, where the received data causes a connection to the meeting environment to be activated.

In other embodiments, data may be received via the data receiving engine 210 seeking to invite the interactive virtual meeting assistant 200 to connect to a meeting at a later time. For instance, the data receiving engine 210 may receive an email via an email inbox, where the data receiving engine 210 may include an email server or may access an external email server to access received emails. In other embodiments, the data receiving engine 210 may receive a message, such as a calendar invitation, via a calendar application. In various embodiments, the received emails or messages may include information about how to connect to the meeting in a body of a message, as an attachment to the message, and so forth. In various embodiments, the data receiving engine 210 may receive a message or other data signal via any kind of application or data connection. The received data, including an email, message, attachment, or other data signal, may include text information in any kind of electronic format, such as hypertext markup language (HTML), plaintext, or any other kind of data that represents text in electronic form, among others.

In such circumstances, where the interactive virtual meeting assistant 200 is to be integrated into the meeting environment at a later time, the scheduling engine 230 may parse the received data to determine information about the meeting, such as the scheduled time and date of the meeting, the location of the meeting, a description of the meeting, a title or summary of the meeting, an inviter or organizer of the meeting, and so forth. Determining the scheduled time and location of the meeting enables the communications engine 220 to connect the interactive virtual meeting assistant 200 to the meeting environment at the scheduled time and location.

In particular, the scheduling engine 230 may receive the text information from the data receiving engine 210 and perform one or more pre-processing operations so that the text information is normalized and formatted according to a standardized format that can be recognized by the text parsing mechanisms included in the scheduling engine 230. The scheduling engine 230 may parse the received pre-processed text information to determine information about the meeting. The information about the meeting includes, but is not limited to, a summary or title of the meeting, an inviter or organizer of the meeting, and how the interactive virtual meeting assistant 200 may join the meeting. Information enabling the interactive virtual meeting assistant 200 to join the meeting environment includes any passcodes, passwords, or meeting identification codes, and so forth. In addition, the information may include network or telephone service information to be used to connect the interactive virtual meeting assistant 200 to the meeting. For instance, a particular network or telephone service may use specified network protocols or a specified type of telephone connection, and the interactive virtual meeting assistant 200 will use this specified service information to be able to connect to the meeting.

In one embodiment, the scheduling engine 230 also determines information related to a description of the meeting. For instance, the information related to the description of the meeting may be any technically feasible type of information describing the meeting, such as, without limitation, the expected duration of the meeting, the expected number of participants in the meeting, whether there will be any breaks in the meeting, whether any refreshments will be provided at the meeting, or any materials to be presented or discussed in the meeting, and so forth.

In one embodiment, the received text information may be received in the form of an email message, where the email message includes a file as an attachment that complies with a particular meeting information format or protocol. In such circumstances, the owner of the meeting may be determined from the attached file. For such an attachment, the attached file may include, without limitation an "organizer" field indicating the organizer or owner of the meeting, and a "sent by" field indicating the party that sent the invitation to the meeting. The scheduling engine 230 may determine that the owner of the meeting is the party identified in the "organizer" field. If the attached file does not include an "organizer" field, the scheduling engine 230 may determine that the owner of the meeting is the party identified in the "sent by" field. Accordingly, the "organizer" and "sent by" fields may be parsed in priority order, giving a higher priority to the "organizer" field. For instance, the owner of the meeting may be identified in the "organizer" field, whereas a third party, such as an administrator or an assistant to the owner of the meeting, may be the party that actually sends the email with the attached file.

In other embodiments, as would be well-understood to persons skilled in the art, for cases where there is no file attached to the email or insufficient information included in the attached file, the email itself may include one or more fields relating to the party that sent the email message. For instance, the email message may include, without limitation, a "reply-to" field, a "sender" field, and a "from" field, among others. Similar to the case of the "organizer" and "sent by" fields within the attached file, the "reply-to," "sender," and "from" fields may be parsed in priority order, giving top priority to the "reply-to" field, next priority to the "sender" field, and lower priority to the "from" field. For instance, the "reply-to" field indicates where replies to the email are directed, which is likely to be the owner of the meeting. By contrast, the "sender" or "from" fields may indicate the account from which the email was sent, which is not necessarily the account of the owner of the meeting. For instance, the "sender" or "from" fields may indicate the account of an email administrator or an assistant to the owner of the meeting. Accordingly, the scheduling engine 230 may cause the received text information to be parsed to identify the owner of the meeting.

Once the scheduling engine 230 determines the information related to the meeting, the scheduling engine 230 stores the information (also referred to herein as the "meeting parameters") in the data stores 260. When the meeting time approaches, the scheduling engine 230 connects the meeting assistant 200 to the meeting via the connection information included in the meeting parameters.

The in-meeting engine 270 operates as a background process when the meeting assistant 200 connects to a meeting through the dial-in infrastructure 140. The in-meeting engine 270 actively performs natural language processing operation on audio data captured from the meeting to identify and act on commands spoken by one or more meeting participants 150 directing the meeting assistant to perform tasks related to the meeting. Such commands include taking notes, performing actions internal or external to the meeting, associating a particular point in time of the meeting with an action to be taken during a meeting post-processing step. The in-meeting engine 270 may also independently identify points in time during the meeting where the assistant 200 performs an action even though an explicit command has not been provided by a meeting participant 150. Such actions include memorializing when meeting participants join/leave a meeting, terminating the connection to the meeting upon determining that the meeting has ended, and determining that a quality of the connection to the meeting has fallen below a threshold and performing one or more remedial operations.

In various embodiments, the interactive virtual meeting assistant 200 may store information in data stores 260. As shown, data stores 260 include, without limitation, meeting parameters 262, meeting metadata 264, and meeting recordings 266. In various embodiments, meeting parameters 262 may store the multiple different fields of meeting information, i.e., the meeting parameters, that enable the interactive virtual meeting assistant 200 to join the meeting environment. In various embodiments, meeting metadata 264 stores information generated during the meeting, as described in herein. In some embodiments, meeting recordings 266 stores audio and other recordings of the actual meeting environment generated during the meeting, as described in detail herein. In addition, the data stores 260 may include any technically feasible other data stores for storing additional information that is generated by or would be useful for the interactive virtual meeting assistant 200. In some embodiments, the data stored in the data store 260 may be stored as part of the interactive virtual meeting assistant 200, or anywhere else in memory 120, or any technically feasible memory, such as an external memory connected to the computer 100 or remotely-accessible by the computer 100.

The meeting post-processing engine 280 performs one or more post-processing operations subsequent to the meeting assistant 200 having participated in the meeting. Post-processing operations include identifying any commands received by the meeting assistant 200 during the meeting that need to be acted upon. These commands include transmitting notifications to meeting participants and/or other entities within an organization, setting up follow-up meetings, creating and transmitting tasks to meeting participants and/or other entities. Post-processing operations also include processing the audio of the meeting recording to generate metrics, tasks, meeting summaries, meeting notes, highlights, etc.

In one embodiment, the meeting post-processing engine 280 generates a meeting graphical user interface (GUI) associated with a meeting in which the meeting assistant 200 participated. The meeting GUI is available for viewing and manipulation by one or more meeting participants 150 and/or other entities. The meeting GUI includes, but is not limited to, a mechanism to playback the meeting recording associated with the meeting, a list of follow-up tasks generated for the meeting, and/or any information generated by the post-processing operations.

Figure 3:
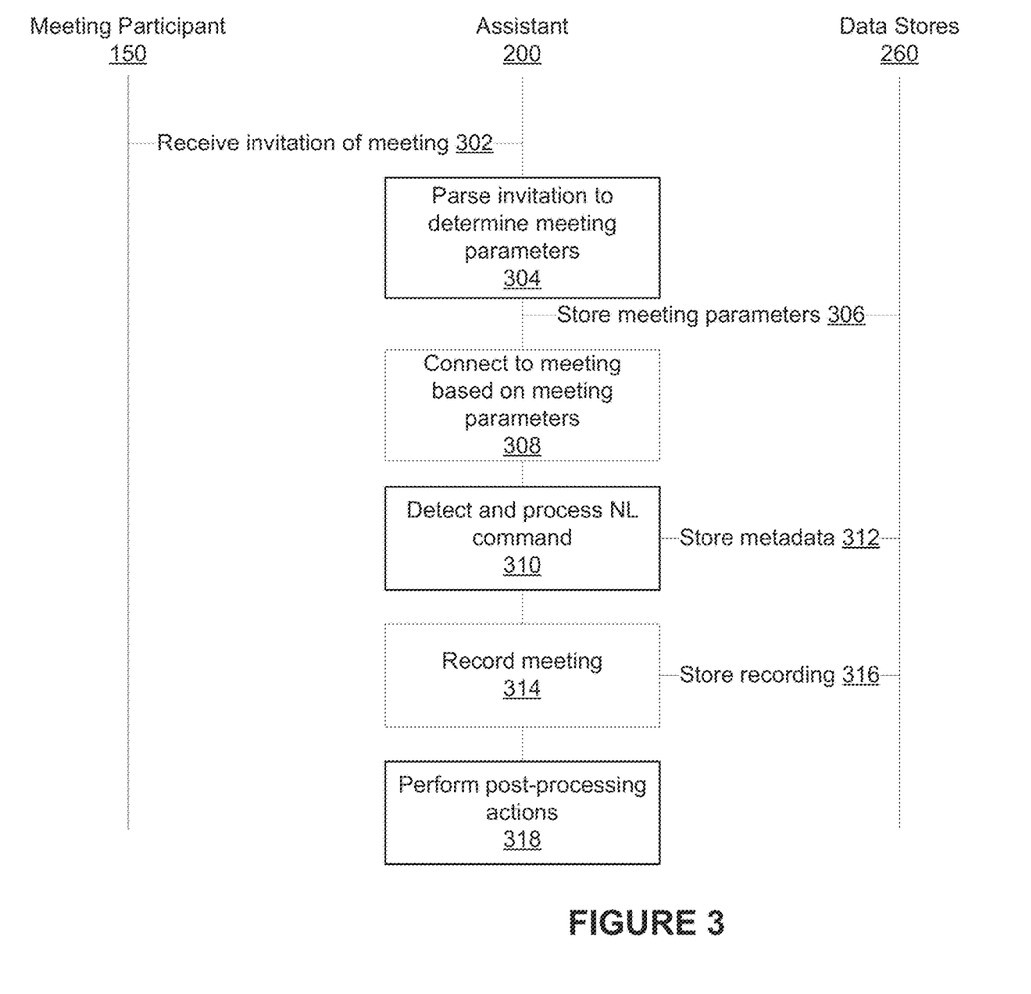
FIG. 3 is a timing diagram illustrating actions performed by the interactive virtual meeting assistant to integrate the interactive virtual meeting assistant into a meeting environment, according to various embodiments of the present invention.

FIG. 3 is a timing diagram illustrating actions performed by the interactive virtual meeting assistant 200 to integrate the interactive virtual meeting assistant into a meeting environment, according to various embodiments of the present invention. Although the actions performed are described in conjunction with FIGS. 1 and 2, persons skilled in the art will understand that any system configured to perform the method steps, in any order, falls within the scope of the present invention.

As shown, a timing diagram 300 begins at step 302, where the interactive virtual meeting assistant 200 receives from one of the meeting participants 150(0) to 150(m) an invitation to cause the interactive virtual meeting assistant 200 to be integrated into the meeting environment. As described herein, the interactive virtual meeting assistant 200 may include a data receiving engine 210 for receiving data in the form of the invitation requesting to integrate the interactive virtual meeting assistant 200 into the meeting environment. As described herein, the invitation may include data that includes text information or includes information from which text information may be derived, including, without limitation, data in the form of a telephone call or other voice information received from the user, text or other data received from the user via a website associated with the interactive virtual meeting assistant 200, text or other data received from the user via an application associated with the interactive virtual meeting assistant 200, or an email or other message containing text information received from the user, among others.

At step 304, the interactive virtual meeting assistant 200 parses the data included in the received invitation to determine one or more meeting parameters associated with the meeting that enable the interactive virtual meeting assistant 200 to join the meeting. In various embodiments, as described herein, the interactive virtual meeting assistant 200 may include a scheduling engine 230 for parsing the text information included in or derived from the received information to generate the one or more meeting parameters.

At step 306, the interactive virtual meeting assistant 200 causes the parsed meeting parameters to be stored in data stores 260. At step 308, the interactive virtual meeting assistant 200 joins the meeting environment based on the stored meeting parameters. In various embodiments, the communications engine 220 may cause the interactive virtual meeting assistant 200 to join the meeting using the stored meeting parameters. For instance, the communications engine 220 may use stored telephone number information to cause the interactive virtual meeting assistant 200 to join a meeting by telephone, or use stored website information to cause the interactive virtual meeting assistant 200 to join a meeting via a website.

At step 310, during the meeting, the interactive virtual meeting assistant 200 detects and processes natural language commands given by the meeting participants 150(0) to 150(m). In various embodiments, the interactive virtual meeting assistant 200 may process commands spoken by the meeting participants 150(0) to 150(m) to cause the interactive virtual meeting assistant 200 to perform some meeting-related action. For instance, the meeting participant may speak details of a command to cause the interactive virtual meeting assistant 200 to perform a meeting related action, such as making a note, memorializing an action item, and so forth.

At step 312, the interactive virtual meeting assistant 200 stores meeting metadata resulting from the natural language commands generated during the meeting in the data stores 260. In various embodiments, the interactive virtual meeting assistant 200 may record meeting metadata resulting from these commands by the meeting participants 150(0) to 150(m) into the meeting metadata data stores 264. For instance, the meeting metadata may include the notes or action items generated during the meeting, such as an action item to send a particular email, to generate a reminder about a deadline, and so forth.

At step 314, the interactive virtual meeting assistant 200 causes the meeting to be recorded. In various embodiments, the interactive virtual meeting assistant 200 may cause an audio and/or video recording of a meeting to be recorded. In some embodiments, the audio and/or video recording may be stored in the meeting recordings data stores 266. At step 316, the interactive virtual meeting assistant 200 causes the meeting recording to be stored in the meeting recordings data stores 266.

At step 318, the interactive virtual meeting assistant 200 causes one or more post-processing actions to be performed based on the stored meeting metadata and/or the stored meeting recordings. In various embodiments, the interactive virtual meeting assistant 200 may include a meeting post-processing engine 280 that performs these meeting post-processing functions on meeting metadata stored in the meeting metadata stores 264, such as by sending an email or a reminder as specified in a note or action item generated during the meeting, and so forth. In addition, in various embodiments, the meeting post-processing engine 280 may perform data analysis or other post-processing operations on audio or video meeting recordings that are stored in meeting recordings data stores 266.

Meeting Debrief Post-Processing Operation

In one embodiment, the meeting post-processing engine 280 implements a meeting debrief operation. In particular, for a given meeting that the interactive virtual meeting assistant 200 participated in or is scheduled to participate in, the meeting post-processing engine 280 enables one or more participants 150 of the meeting to associate a debrief with the meeting. The debrief may be an audio recording, a video recording, text, or any file. The meeting post-processing engine 280 stores the debrief in the data stores 260 and provides access to the debrief via the meeting GUI associated with the meeting. The debrief may be private, such that only the participant 150 who provided the debrief may subsequently access the debrief. Alternatively, in some embodiments, the debrief may be public or partially public, such that another participant 150 or entity different from the participant 150 who provided the debrief may subsequently access the debrief.

Figure 4:
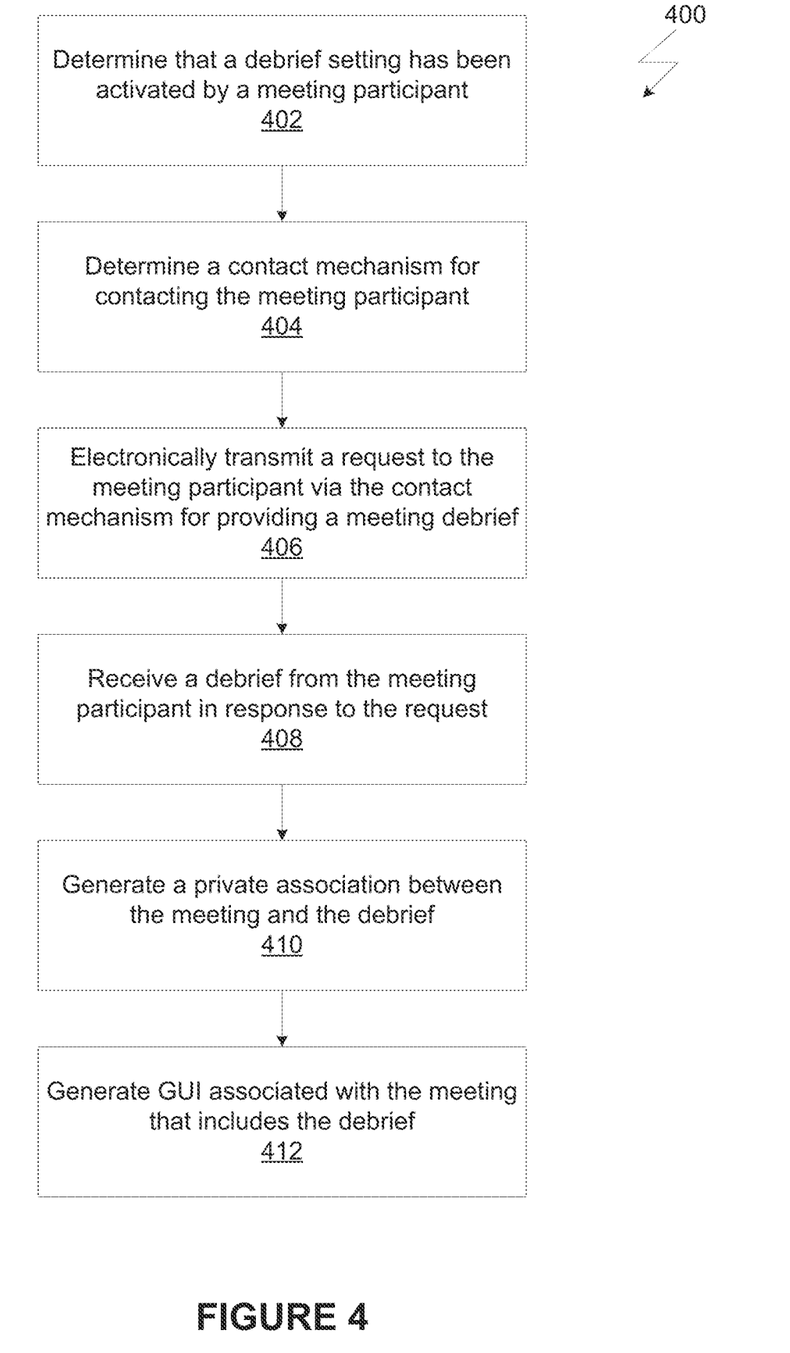
FIG. 4 is a flow diagram illustrating a method for associating a debrief with a meeting processed by the interactive virtual meeting assistant, according to various embodiments of the present invention.

FIG. 4 is a flow diagram illustrating a method for associating a debrief with a meeting processed by the interactive virtual meeting assistant 200, according to various embodiments of the present invention. Although the actions performed are described in conjunction with FIGS. 1 and 2, persons skilled in the art will understand that any system configured to perform the method steps, in any order, falls within the scope of the present invention.

The method 400 begins at step 402, where the interactive virtual meeting assistant 200 determines that, for a given meeting processed by the interactive virtual meeting assistant 200, a debrief setting associated with a meeting participant 150 has been activated. The debrief setting is stored in the data stores 260 in a user profile associated with the meeting participant 150. In one embodiment, the debrief setting is a global setting such that the setting applies to every meeting in which the meeting participant 150 is a participant. In another embodiment, the debrief setting is a meeting-specific setting such that the setting applies to only one meeting in which the meeting participant 150 is a participant. In yet another embodiment, the debrief setting is specific to particular type of meeting (e.g., team meeting, external meeting, all-hands meeting, etc.) such that the setting applies to only meetings of the particular type in which the meeting participant 150 is a participant.

At step 404, the interactive virtual meeting assistant 200 determines a contact mechanism for contacting the meeting participant 150 to request the debrief for the meeting. The contact mechanism may be a telephone number, an email address, a social media handle, a messaging service identifier, or any other technically feasible mechanism for contacting the meeting participant 150. In one embodiment, the contact mechanism may be stored in the data stores 260 in a user profile associated with the meeting participant 150. In one embodiment, the user initiates the communication with the virtual meeting assistant 200 to provide the debrief for the meeting without being expressly requested for providing the debrief.

At step 406, the interactive virtual meeting assistant 200 electronically transmits a request to the meeting participant 150 via the contact mechanism for providing the debrief of the meeting. In one embodiment, the request includes a uniform resource locator (URL) or other type of link to an application that enables the meeting participant 150 to record or otherwise provide the debrief.

At step 408, the interactive virtual meeting assistant 200 receives the debrief from the meeting participant 150 in response to the request. At step 410, the interactive virtual meeting assistant 200 generates a private association between the meeting and the debrief. The private association indicates that only the meeting participant 150 may subsequently access the debrief. In one embodiment, the interactive virtual meeting assistant 200 stores the debrief in the data stores 260 in conjunction with the meeting. The debrief may be associated with various metadata of the meeting including, without limitation, the name and email address of meeting participants, the title of the meeting, the agenda of the meeting, the audio recording of the meeting, and/or any public or private notes associated with the meeting.

At step 412, the interactive virtual meeting assistant 200 generates a GUI associated with the meeting for presentation to the meeting participant 150 that includes the debrief. Further, the interactive the interactive virtual meeting assistant 200 may provide (either through a request from or a push to) the debrief to external systems. These external systems may be collaboration tools, information management systems, customer relationship management (CRM) systems, etc. The debrief provided to such external systems may be provided in a format that enables users of those systems to perform actions, such as view, interact with, share, and/or store, in association with the debrief.

In one embodiment, the interactive virtual meeting assistant 200 generates a transcription of the debrief and includes the transcription in the GUI associated with the meeting. In addition, the interactive virtual meeting assistant 200 evaluates the content of the debrief to perform one or more post-processing operations. These include identifying any commands received by the meeting assistant 200 during the meeting that need to be acted upon. The commands may include transmitting notifications to meeting participants and/or other entities within an organization, setting up follow-up meetings, creating and transmitting tasks to meeting participants and/or other entities.

Figure 5:
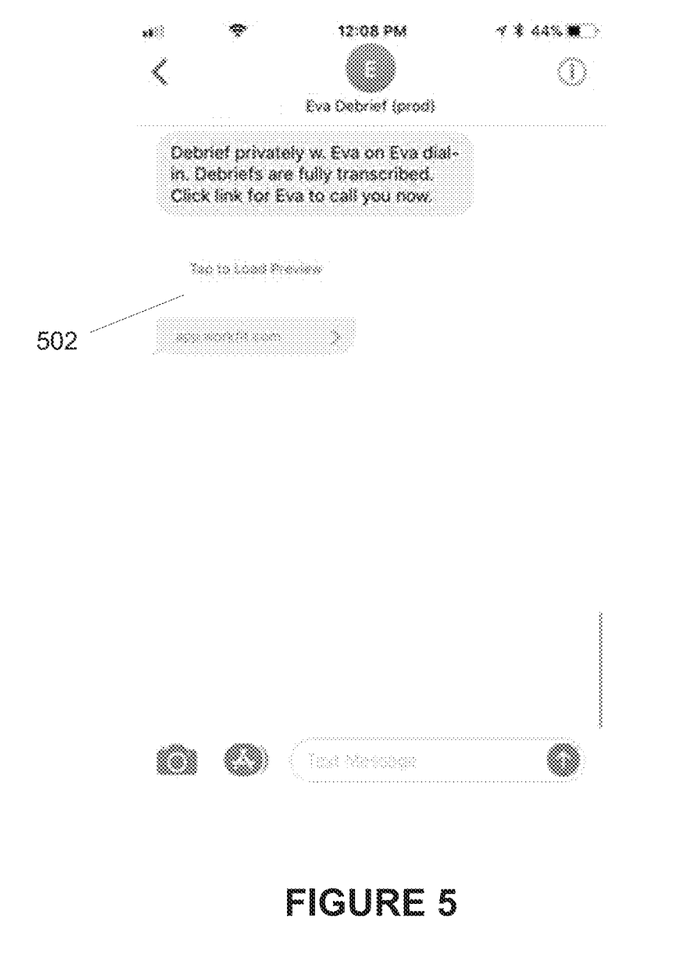
FIG. 5 illustrates an example of a request transmitted by the interactive virtual meeting assistant for providing the debrief, according to various embodiments of the present invention.

FIG. 5 illustrates an example of a request transmitted by the interactive virtual meeting assistant 200 for providing the debrief, according to various embodiments of the present invention. As shown, the meeting participant 150 receives a text message that includes a link 502 to an application that enables the meeting participant 150 to record or otherwise provide the debrief. In one embodiment, the text message is transmitted to the meeting participant 150 via a short message service based on a telephone number associated with the meeting participant.

Figure 6:
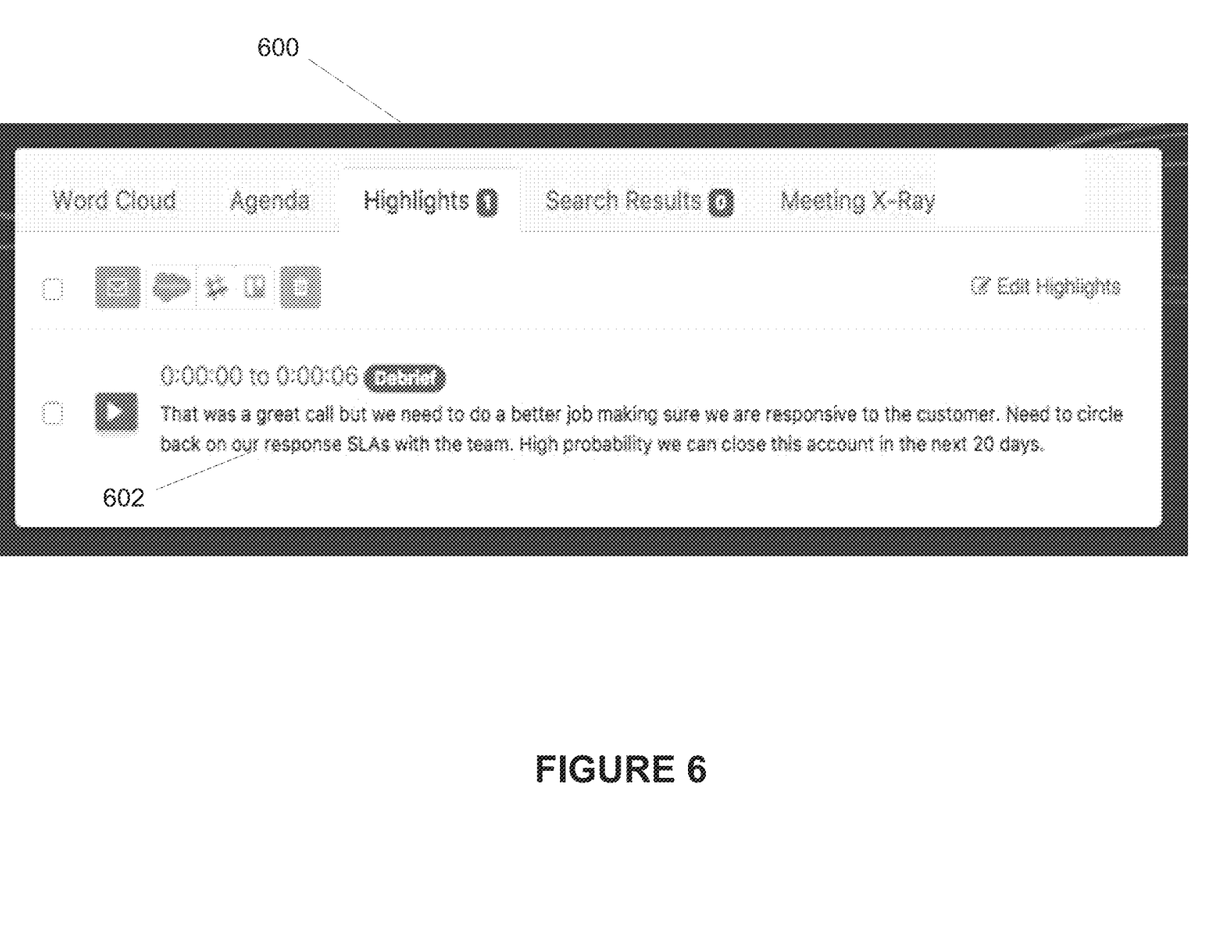
FIG. 6 illustrates an example of a meeting GUI that includes a debrief view provided to the meeting participant, according to various embodiments of the present invention.

FIG. 6 illustrates an example of a meeting GUI 600 that includes a debrief view 602 provided to the meeting participant 150, according to various embodiments of the present invention. As shown, the debrief view 602 includes a transcription of a debrief provided by the meeting participant 150. The debrief view 602 also enables a user of the meeting GUI 600 to replay the debrief if the debrief is an audio or a video recording.

Advantageously, the debrief post-processing operation is automatically triggered subsequent to a meeting concluding. Consequently, the debrief post-processing operation enables a meeting participant 150 to provide personal follow-ups or record reactions close in time to the meeting concluding even if the meeting participant 150 is on the go. Further, privately associating a debrief with a meeting allows for the debrief to only be accessed by the meeting participant 150 should the meeting participant want to keep the debrief private. In such a manner, a meeting GUI generated for a meeting includes both information available to all the participants of the meeting and information (such as the debrief) available to only the participant that provided the information or indicated that such information be kept private.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

The invention claimed is:

1. A method comprising:
receiving, by a virtual meeting assistant, a meeting invite from one of a plurality of meeting participants of a meeting;
parsing, by the virtual meeting assistant, a plurality of meeting parameters from the meeting invite, the plurality of parameters enabling the virtual meeting assistant to join the meeting;
electronically connecting, by the virtual meeting assistant, to a meeting platform based on the plurality of meeting parameters parsed from the meeting invite;
determining, via a background process that operates during the meeting and independently identifies when meeting participants leave the meeting, that meeting has concluded; and
subsequent to determining that the meeting has concluded, for a first participant of the plurality of participants:
determining, by the interactive virtual meeting assistant, that a debrief setting associated with the first participant is activated and applicable to the meeting, wherein determining, by the interactive virtual meeting assistant, that the debrief setting is activated and applicable to the meeting comprises accessing, by the interactive virtual meeting assistant, the debrief setting from a user profile associated with the first participant and stored in a data store, and wherein the debrief setting is activated for a meeting type associated with the meeting in which the first participant is a participant,
electronically transmitting, by the interactive virtual meeting assistant, a request to the first participant for providing a debrief associated with the meeting, wherein the request comprises a link to an application that enables the first participant to provide the debrief,
in response to the request, receiving, by the interactive virtual meeting assistant, the debrief associated with the meeting,
generating, by the interactive virtual meeting assistant, a private association between the debrief and the meeting, the private association limiting access to the debrief only to the first participant, and
generating, by the interactive virtual meeting assistant, a post meeting task from the debrief.

2. The method of claim 1, wherein electronically transmitting the request comprises transmitting the request to the first participant via a text-based message over a telecommunications network.

3. The method of claim 1, wherein the debrief is a recorded audio and/or video message provided by the first participant.

4. The method of claim 1, wherein the debrief is a text message provided by the first participant.

5. The method of claim 1, further comprising transcribing the debrief for presentation to the first participant.

6. The method of claim 1, further comprising evaluating content of the debrief to generate the post meeting task associated with the meeting.

7. The method of claim 1, further comprising presenting the debrief in conjunction with a debrief view of a meeting graphical user interface associated with the meeting.

8. The method of claim 1, further comprising transmitting the debrief to an external system for presentation to a user within an interface managed by the external system.

9. A non-transitory computer readable medium comprising instructions that, when executed by a processor, cause the processor to execute instructions associated with a virtual meeting assistant that performs the steps of:
- receiving, by the virtual meeting assistant, a meeting invite from one of a plurality of meeting participants of a meeting;
- parsing, by the virtual meeting assistant, a plurality of meeting parameters from the meeting invite, the plurality of parameters enabling the virtual meeting assistant to join the meeting;
- electronically connecting, by the virtual meeting assistant, to a meeting platform based on the plurality of meeting parameters parsed from the meeting invite
- determining, via a background process that operates during the meeting and independently identifies when meeting participants leave the meeting, that the meeting has concluded; and
- subsequent to determining that the meeting has concluded, for a first participant of the plurality of participants:
  - determining, by the interactive virtual meeting assistant, that a debrief setting associated with the first participant is activated and applicable to the meeting, wherein determining that the debrief setting is activated and applicable to the meeting comprises accessing the debrief setting from a user profile associated with the first participant and stored in a data store, and wherein the debrief setting is activated for a meeting type associated with the meeting in which the first participant is a participant,
  - electronically transmitting, by the interactive virtual meeting assistant, a request to the first participant for providing a debrief associated with the meeting,
  - in response to the request, receiving, by the interactive virtual meeting assistant, the debrief associated with the meeting,
  - generating, by the interactive virtual meeting assistant, a private association between the debrief and the meeting, the private association limiting access to the debrief only to the first participant, and
  - generating, by the interactive virtual meeting assistant, a post meeting task from the debrief.

10. The computer readable medium of claim 9, wherein electronically transmitting the request comprises transmitting the request to the first participant via a text-based message over a telecommunications network.

11. The computer readable medium of claim 9, wherein the link enables the application through which the debrief is recorded.

12. The computer readable medium of claim 9, the steps further comprising transcribing the debrief for presentation to the first participant.

13. The computer readable medium of claim 9, the steps further comprising evaluating content of the debrief to generate the post meeting task associated with the meeting.

14. A computer system, comprising:
- a memory storing instructions associated with a virtual meeting assistant; and
- a processor for executing the instructions to perform the steps of:
  - receiving, by the virtual meeting assistant, a meeting invite from one of a plurality of meeting participants of a meeting;
  - parsing, by the virtual meeting assistant, a plurality of meeting parameters from the meeting invite, the plurality of parameters enabling the virtual meeting assistant to join the meeting;
  - electronically connecting, by the virtual meeting assistant, to a meeting platform based on the plurality of meeting parameters parsed from the meeting invite,
  - determining, via a background process that operates during the meeting and independently identifies when meeting participants leave, that the meeting has concluded, and
  - subsequent to determining that the meeting has concluded, for a first participant of the plurality of participants:
    - determining, by the interactive virtual meeting assistant, that a debrief setting associated with the first participant is activated and applicable to the meeting, wherein determining that the debrief setting is activated and applicable to the meeting comprises accessing the debrief setting from a user profile associated with the first participant and stored in a data store, and wherein the debrief setting is activated for a meeting type associated with the meeting in which the first participant is a participant,
    - electronically transmitting, by the interactive virtual meeting assistant, a request to the first participant for providing a debrief associated with the meeting, wherein the request comprises a link to an application that enables the first participant to provide the debrief,
    - in response to the request, receiving, by the interactive virtual meeting assistant, the debrief associated with the meeting,
    - generating, by the interactive virtual meeting assistant, a private association between the debrief and the meeting, the private association limiting access to the debrief only to the first participant, and
    - generating, by the interactive virtual meeting assistant, a post meeting task from the debrief.

15. The computer system of claim 14, wherein the debrief is a recorded audio and/or video message provided by the first participant.

16. The computer system of claim 14, wherein the debrief is a text message provided by the first participant.

17. The computer system of claim 14, further comprising transcribing the debrief for presentation to the first participant.

18. The computer system of claim 14, further comprising evaluating content of the debrief to generate the post meeting task associated with the meeting.

19. The computer system of claim 14, further comprising presenting the debrief in conjunction with a debrief view of a meeting graphical user interface associated with the meeting.

20. The computer system of claim 14, further comprising transmitting the debrief to an external system for presentation to a user within an interface managed by the external system.

* * * * *